(12) United States Patent
Bartel et al.

(10) Patent No.: US 6,336,447 B1
(45) Date of Patent: Jan. 8, 2002

(54) METHOD AND APPARATUS FOR COMPRESSION BRAKE ENHANCEMENT USING FUEL AND AN INTERCOOLER BYPASS

(75) Inventors: John B. Bartel, Hedgesville, WV (US); Joseph H. Schmidt, Hagerstown; Jeffrey S. Zsoldos, Mount Airy, both of MD (US); Timothy Suder, Greencastle, PA (US)

(73) Assignee: Mack Trucks, Inc., Allentown, PA (US)

(*) Notice: Subject to any disclaimer, the term of this patent is extended or adjusted under 35 U.S.C. 154(b) by 0 days.

(21) Appl. No.: 09/566,483

(22) Filed: May 8, 2000

(51) Int. Cl.$^7$ .................................. F02B 33/00
(52) U.S. Cl. .................. 123/559.1; 123/563; 60/599
(58) Field of Search ............... 123/559.1, 563; 60/599

(56) References Cited

U.S. PATENT DOCUMENTS

| | | | |
|---|---|---|---|
| 3,220,392 A | | 11/1965 | Cummins |
| 4,010,613 A | * | 3/1977 | McInerney ........... 60/599 |
| 4,296,605 A | | 10/1981 | Price |
| 4,395,884 A | | 8/1983 | Price |
| 4,741,307 A | | 5/1988 | Meneely |
| 4,848,289 A | | 7/1989 | Meneely |
| 4,932,372 A | | 6/1990 | Meneely |
| 5,119,795 A | | 6/1992 | Goto et al. |
| 5,385,019 A | | 1/1995 | Kulig et al. |
| 5,634,447 A | * | 6/1997 | Rowells ............... 123/322 |

OTHER PUBLICATIONS

Truck Engine Charge Air Cooling—Experience Trends and Developments, Berg, et al., Volvo Truck Corp., Sae Technical Paper Series #831199, West Coast International Meeting, Aug. 8–11, 1983, cover & pp 1–11.

Reciprocating Compressors and Engines, Engines, Compressors and Turbines, pp. 154–155. Applications of Thermodynamics Jun. 1982.

"Recomended Starting and Warm–Up Procedures for 1991 E7 Engines", 1990–1991 E7 12 Liter Engine Comparison, Mack Trucks, Dec. 1990, pp. 31–34, cover.

* cited by examiner

Primary Examiner—Hoang Nguyen
(74) Attorney, Agent, or Firm—Rothwell, Figg, Ernst & Manbeck

(57) ABSTRACT

An engine exhaust braking method and apparatus bypasses intake air around the intercooler from the turbocharger while simultaneously injecting a minimum amount or greater of fuel per stroke into an engine cylinder during engine brake operation. The minimum amount of fuel is determined such that it is the smallest amount of fuel which will fully combust when the engine is operating at a particular speed. The apparatus includes a combustion engine, a turbocharger, an intercooler, and a compression release braking system. The compression release braking system includes an engine or vehicle electronic control unit, a compression release brake controller, a fuel injector, and an intercooler bypass assembly, wherein while the engine brake is engaged, a small amount of fuel is injected into the cylinders during the compression stroke, and engine intake air is bypassed around the intercooler from the turbocharger and directly into the engine.

20 Claims, 5 Drawing Sheets

METHOD AND APPARATUS FOR COMPRESSION BRAKE ENHANCEMENT USING FUEL AND AN INTERCOOLER BYPASS

BACKGROUND OF THE INVENTION

1. Field of the Invention

The present invention relates to the field of compression release engine braking.

2. Description of the Background Art

Compression release engine braking, or simply engine braking, is an engine operating mode wherein the engine is reconfigured during operation to provide a braking effect to a vehicle by essentially turning the engine into a compressor. This may be desirable or necessary when regular wheel brakes are inadequate to provide complete braking. An example is a need for powerful and prolonged braking operations by heavily loaded trucks on steep grades, such as on mountain roads. Engine braking finds particular applicability on large vehicles having high wheel weights and correspondingly high momentum, and where conventional wheel brakes may fade or fail under high loading conditions or under prolonged use.

Engine brakes commonly operate by shutting the fuel off to the engine and simultaneously opening one or more exhaust valves for the engine cylinders near top dead center ("TDC") of the cylinders' compression strokes. This in effect causes the engine to do work in compressing the engine intake gases without allowing it to recover the energy of compression during the expansion strokes of the cylinders. Thus, energy is dissipated by the engine and the vehicle is thereby slowed without having to use standard wheel brakes.

Turbocharged engines are also well known in the art. A standard turbocharger uses the exhaust gases from the engine to spin a turbine. The mechanical energy of the turbine is then used advantageously to compress the intake air of the engine. Furthermore, an intercooler, essentially an air-to-air heat exchanger, is often used concurrently to cool the compressed intake air from the turbocharger so that it does not enter the engine at too high a temperature.

Rowells, U.S. Pat. No. 5,634,447, discloses an approach to engine braking wherein fuel is injected into a turbocharged non-intercooled engine during engine braking for increased braking power. Rowells injects a small quantity of fuel into the cylinders of the engine well in advance of top dead center on the compression stroke. The small amount of fuel combusts, thus raising cylinder pressure during compression and increasing energy to the turbocharger, inherently increasing braking power. However, when the engine utilizes an intercooler (air-to-air) which greatly reduces the intake air temperature into the engine, combustion engines experience problems burning the fuel injected during engine braking due to the cool temperature of the intake combustion air, especially in colder climates. At middle to lower engine speeds, the fuel is even harder to ignite. Thus, where engine braking is needed the most, e.g., in class 8 heavy duty trucks which are all intercooled (air-to-air), the positive effect of the approach disclosed in Rowells is negated.

Kulig et al., U.S. Pat. No. 5,385,019, discloses an approach to increasing the engine braking power and efficiency of an internal combustion engine equipped with a turbocharger and intercooler assembly. Kulig increases the mass flow of intake air to the engine by bypassing the intercooler during operation of the engine brake. The Kulig patent explains that this is done in order to provide higher pressure air to the intake manifold of the engine, thus requiring more work from the engine to compress the air. As engine speed decreases, however, the turbocharger compresses the engine intake air less and less. The engine braking approach disclosed in Kulig becomes less effective at lower engine speeds.

Therefore, there remains a need in the art for improvements in engine braking systems.

SUMMARY OF THE INVENTION

The method of the present invention includes bypassing intake air around the intercooler from the turbocharger while simultaneously injecting a minimum amount or greater of fuel per stroke into an engine cylinder during engine brake operation. The minimum amount of fuel is determined such that it is the smallest amount of fuel which will fully combust when the engine is operating at a given speed.

The apparatus of the present invention is an improvement upon standard internal combustion engines equipped with a turbocharger, an intercooler, and a compression release brake. The compression release brake comprises a compression release brake controller, a fuel injector assembly, and an intercooler bypass assembly. The apparatus operates such that during engine braking, a small amount of fuel is injected into the cylinders during the compression stroke, and engine intake air is bypassed around the intercooler from the turbocharger and directly into the engine.

Engine braking done using a simultaneous minimum fuel injection (or greater) and intercooler bypass causes a synergistic increase in engine braking power and efficiency throughout the speed range. Increased engine intake air temperature and pressure resulting from the intercooler bypass during engine braking causes a minimum amount of fuel injected into the engine cylinders to be more completely combusted by the compression stroke than if no bypass had been done. This combustion alone dissipates more energy during braking, but also results in higher temperature and pressure exhaust gases. These higher energy exhaust gases in turn provide more power to the turbocharger which then compresses the intake air more, thus compounding the initial bypass effect. Furthermore, the amount of fuel which must be injected to obtain a given braking power during engine braking with intercooler bypass is necessarily less than without bypass. Thus, overall fuel economy is improved.

The above and other features and advantages of the present invention will be further understood from the following description of a preferred embodiment thereof, taken in conjunction with the accompanying drawings.

DETAILED DESCRIPTION OF THE INVENTION

Figure 1:
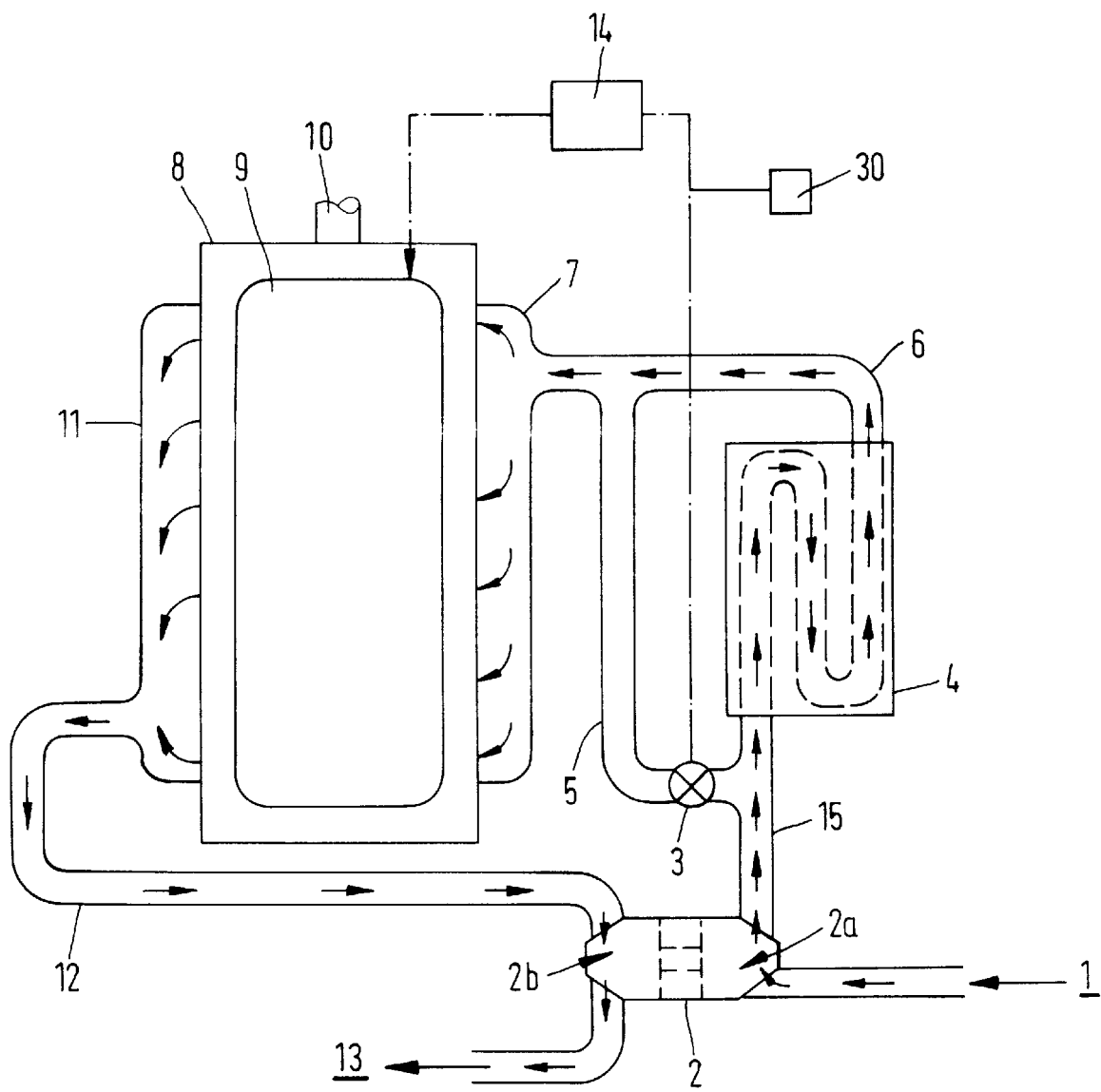
FIG. 1 is a schematic diagram of an embodiment of the present invention as it operates during normal engine combustion.
Figure 2:
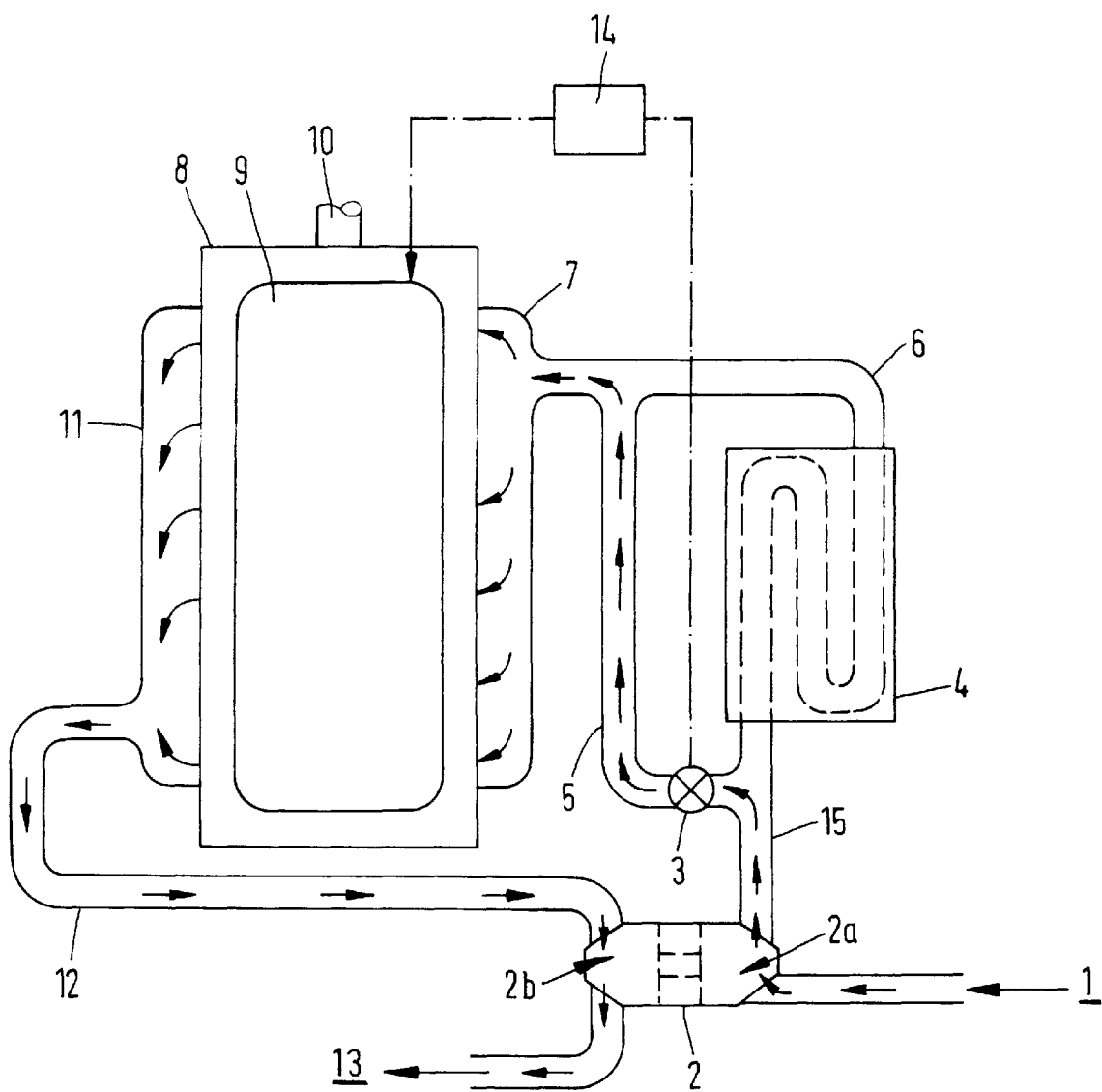
FIG. 2 is a schematic diagram of an embodiment of the present invention as it operates when engine braking is engaged.

FIGS. 1 and 2 schematically depict a preferred embodiment of an apparatus of the present invention comprised generally of an internal combustion engine 8, a turbocharger 2, an intercooler 4, a compression release engine brake 9, an engine or vehicle electronic control unit (ECU) 14, and an engine brake controller 30. Normal operation of the engine 8 is depicted in FIG. 1, while engine 8 operation with the engine brake 9 engaged is depicted in FIG. 2.

Referring to FIG. 1, during normal operation, the intake air 1 enters the compressor 2a of the turbocharger 2. Here, the intake air is compressed such that when it reaches intercooler conduit 15, the air is at a higher temperature and pressure. Valve 3 is closed, so the compressed intake air is channeled through intercooler 4. Preferably, intercooler 4 is an air to air intercooler which uses ambient air as the cooling medium. The heat exchange provided by the intercooler 4 causes the air exiting through the intake manifold conduit 6 to be at a significantly lower temperature than it was when it exited the turbocharger 2.

The compressed and intercooled intake air travels through intake manifold conduit 6 and enters the intake manifold 7. Here, the intake air enters the engine 8, is mixed with fuel and combusted, thus forming exhaust gases and transferring work to the drive shaft 10.

The exhaust gases are vented from the engine into exhaust manifold 11, and are channeled through exhaust manifold conduit 12 to the turbocharger 2. The exhaust gases pass through a turbine 2b inside the turbocharger 2, which, as is appreciated by persons skilled in the art, powers the turbocharger's compressor 2a. The exhaust gases then exit 13 the turbocharger and are typically sent to an exhaust treatment system (not shown).

FIG. 2 depicts the same engine assembly as in FIG. 1, except that engine braking has been engaged. When the driver of the vehicle engages engine braking, a signal is sent from the engine brake controller 30 or ECU 14 to the engine brake 9 and the valve 3. Valve 3 can be of any type known in the art for controlling gas flow within a pipe, but preferably it is an electronically or pneumatically actuated butterfly valve. Upon receiving the appropriate signal from the controller 30 or ECU 14, the valve 3 opens.

The valve 3 being open causes most of the compressed air flowing from the turbocharger through conduit 15 to flow through the bypass conduit 5 as opposed to through the intercooler 4. This is because there is a much lower pressure drop caused by the bypass conduit 5 than by the intercooler. The compressed intake air thus reaches the intake manifold 7 at a significantly higher temperature and pressure than it would have had the intercooler not been bypassed. Alternatively, a two-butterfly valve system may be utilized.

Figure 4A:
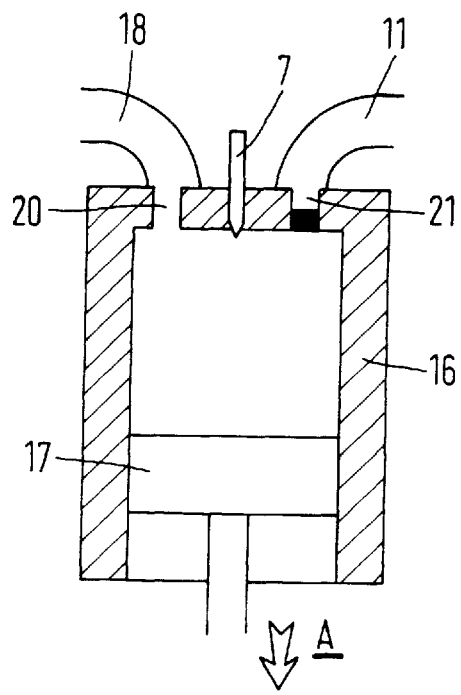
FIGS. 4a–4d are schematic diagrams of a cylinder within an internal combustion engine during various times of a common engine braking cycle within the prior art.
Figure 4B:
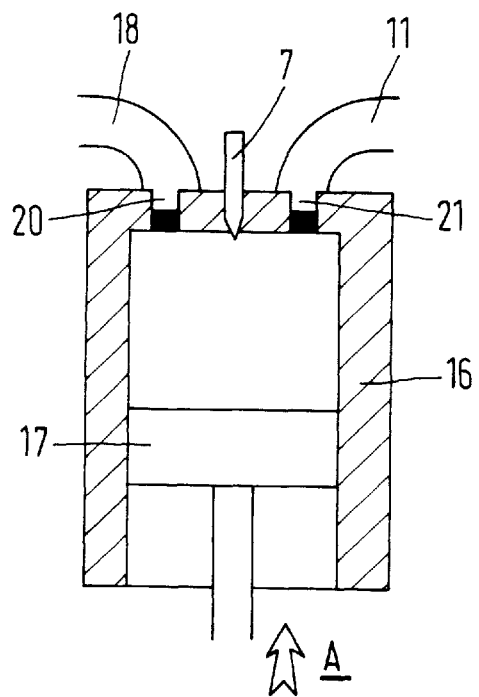
Figure 4C:
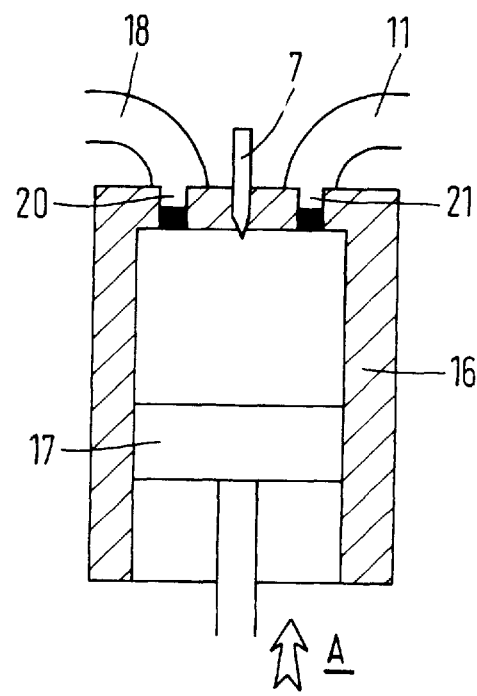

The compressed air then enters the engine 8, into a plurality of engine cylinders. A typical cylinder 16 of a prior art combustion engine in engine braking mode is depicted in FIGS. 4a–4c. Under the prior art, turbocharged and intercooled air is first drawn, as shown by FIG. 4a, into a cylinder 16 from the intake manifold 7 through intake valve 20. This is accomplished by opening the intake valve 20 while piston 17 is proceeding downward (movement of piston 17 is indicated by arrow A) on an intake stroke.

Once the piston 17 reaches bottom dead center ("BDC"), it begins the compression stroke. As shown in FIGS. 4b and 4c, during the compression stroke, the intake valve 20 is closed as the piston proceeds upward. This compression stroke requires work from the drive shaft 10 and thus provides a braking effect to the vehicle.

Figure 4D:
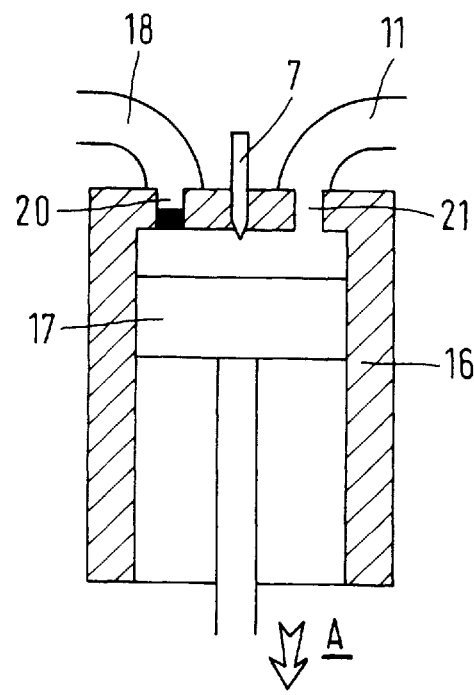

As shown in FIG. 4d, the piston 17 approaches top dead center ("TDC") and exhaust valve 21 opens. This vents the compressed intake air out into the exhaust manifold 11 and does not allow the piston 17 to "rebound" and recapture the energy expended on the compression stroke. As the piston continues downward from TDC, exhaust valve 21 remains open or optionally can close.

Figure 3A:
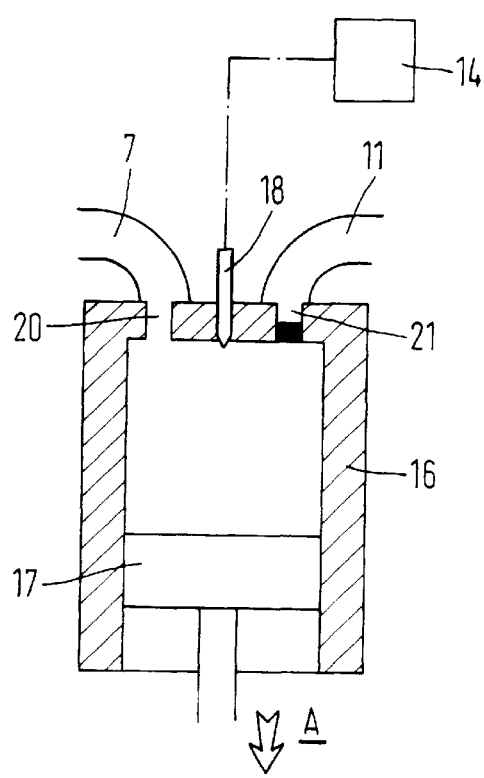
FIGS. 3a–3d are schematic diagrams of a cylinder within an internal combustion engine during various times of an engine braking cycle of the present invention.

FIGS. 3a through 3d correspond to FIGS. 4a through 4d, but instead depict a typical cylinder of a combustion engine equipped with a compression release engine brake system of the present invention. FIG. 3a shows the piston 17 proceeding downward on the intake stroke whereby compressed, but not intercooled, intake air is drawn from the intake manifold 7 through intake valve 20. Thus, the air in the cylinder 16 of FIG. 3a is at a higher temperature and pressure than the air in cylinder 16 of FIG. 4a.

Figure 3C:
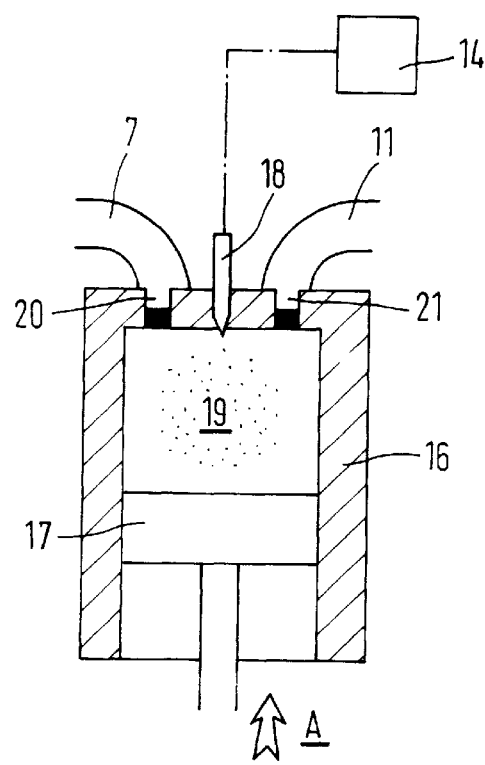
Figure 3B:
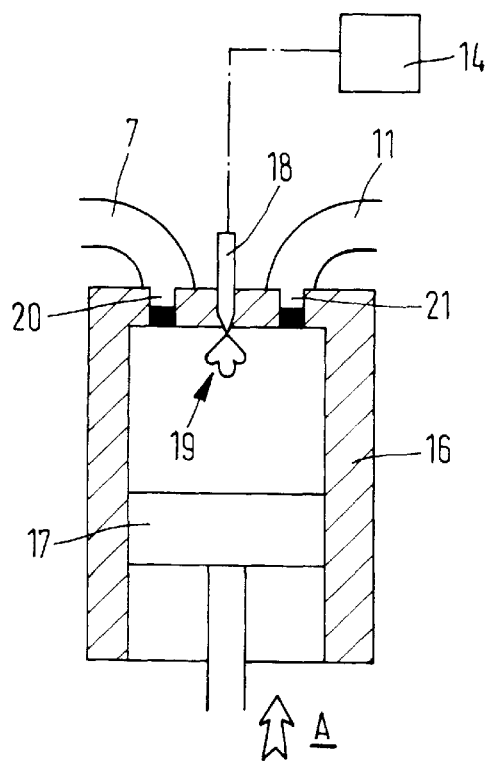
Figure 3D:
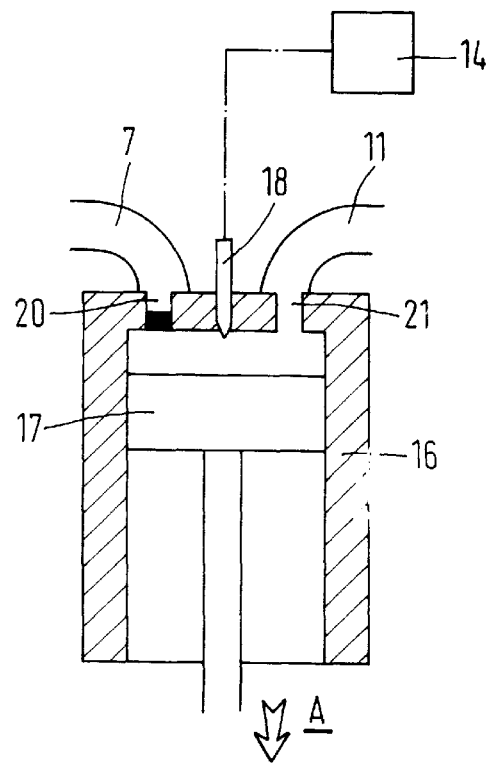

FIG. 3b shows that after the compression stroke has begun and intake valve 20 has been closed, a small amount of fuel 19 is caused to be injected from fuel injection nozzle 18 into the cylinder 16 in response to a signal from the engine brake controller 30 or ECU 14. The piston continues to proceed upward on the compression stroke, and, as depicted in FIG. 3c, the small amount of fuel 19 completely combusts with the intake air. The combustion during the compression stroke requires more work from the drive shaft 10 to compress the combusted mixture than simply compressing the intake air as in FIGS. 4b and 4c, and thus provides an improved braking effect to the vehicle. As the piston approaches TDC, exhaust valve 21 opens and vents the combustion gases out into the exhaust manifold 11. The piston then begins a downward expansion stroke, and valve 21 stays open or it can close.

Referring again to FIG. 2, the exhaust gases are vented from the engine into exhaust manifold 11, and are channeled through exhaust manifold conduit 12 to the turbocharger 2. The exhaust gases pass through a turbine 2b inside the turbocharger 2, which, as is appreciated by persons skilled in the art, powers the turbocharger's compressor 2a. The exhaust gases then exit 13 the turbocharger and are typically sent to an exhaust treatment Is system (not shown).

Trial 1

An internal combustion engine of the present invention as depicted by FIGS. 1 and 2 is operated with the compression release brake 9 engaged, but with valve 3 manually closed. The effect is to force the compressed air exiting the turbocharger 2 through the intercooler 4 and not through the intercooler bypass 5.

The engine drive shaft 10 is driven in intervals at speed increments ranging from about 1100 rpm, the typical start of braking speed of a turbocharged compression engine, to about 2100 rpm, so as to simulate the braking conditions on a vehicle traveling at various speeds and gears (transmission gear). Fuel was completely cut off, and the retarding effect of the engine 8, with the compression release brake 9 engaged, was measured.

Over the same rpm range, the engine braking effectiveness of the engine was measured when a small amount of fuel (5 to 45 mg/stroke) was injected during the compression stroke, as disclosed by the Rowells patent. Good results were obtained for this configuration when the engine speed was above 1500 rpm. At 1500 rpm, the fuel injection had to be increased to 30 mg/stroke for any combustion, albeit incomplete combustion, to occur at all. Below this speed, combustion could not be sustained regardless of the amount of fuel injected during each stroke.

Figure 5:
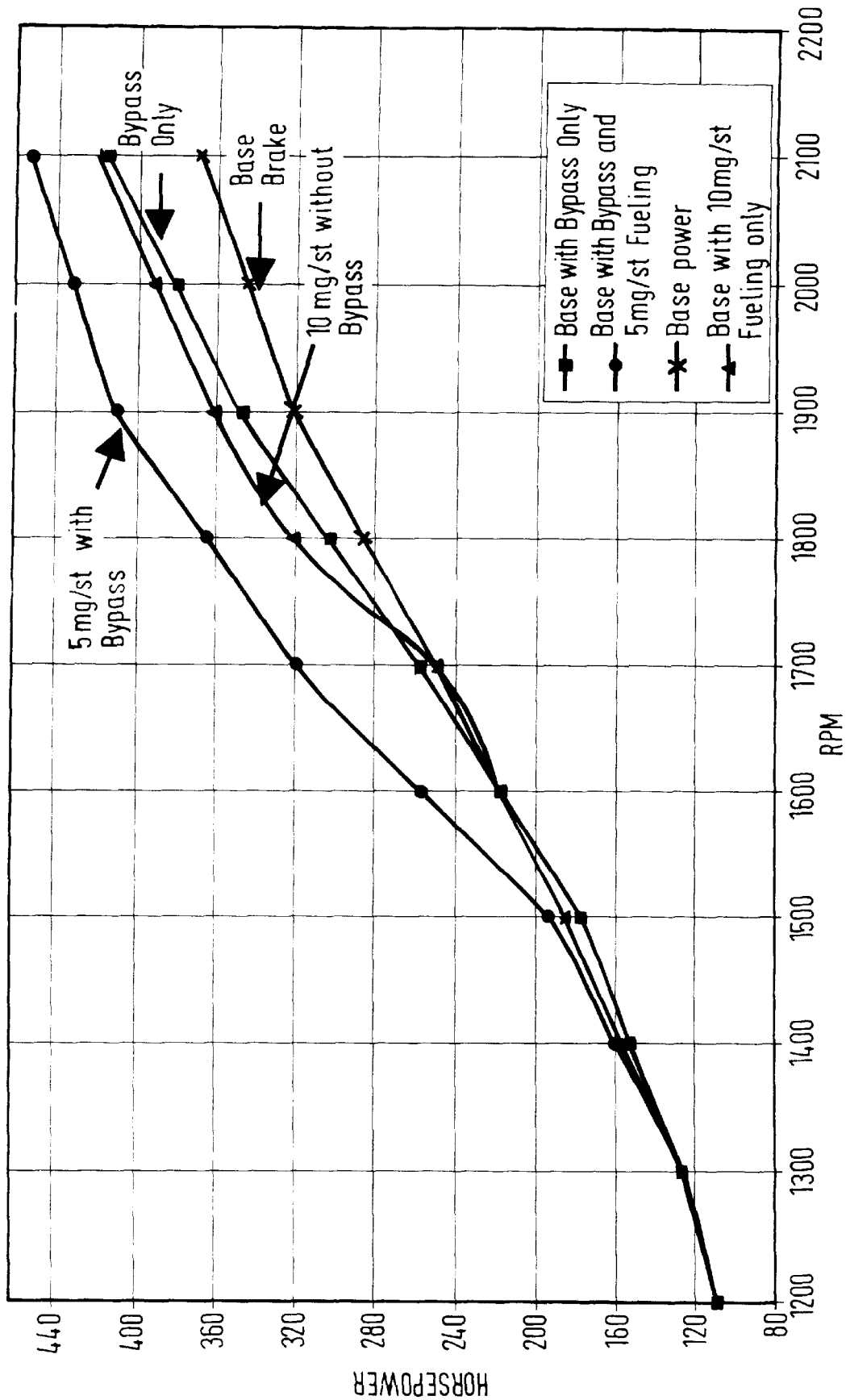
FIG. 5 is a graph depicting experimental data which compares the effectiveness of standard engine braking and engine braking using fuel injection at various engine speeds, both being done without intercooler bypass.

Thus, while injection of fuel during the compression stroke in engine braking provides significant gains in braking horsepower at higher speeds, fuel injection at speeds of 1500 rpm and below did not provide any noticeable improvement. FIG. 5 graphically represents the data from these trials.

Trial 2

The engine was then driven over the same speed intervals, but this time with the valve 3 placed in the open position. Thus, the intake air was being turbocharged, but not intercooled, as it passes through the open intercooler bypass conduit 5.

The results of trial 2 are presented in FIG. 5, and they show that middle range braking power was greatly increased, even at fuel amounts around 5 mg/stroke.

Comparison of the results obtained from trial 1 and trial 2 evidences that it is difficult to burn even a small amount of fuel injected during engine braking at middle range to low range engine speeds. By raising the inlet air temperature, the present invention allows the fuel to burn more completely and consistently. Furthermore, it allows a smaller portion of fuel to be used to achieve the same amount of braking power. Thus, engine braking power at mid-range speeds is improved significantly while simultaneously using less fuel than prior art methods and apparatuses.

As will be appreciated by one skilled in the art, the present invention is equally applicable to 2 cycle and 4 cycle engine braking.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. An internal combustion engine having at least one cylinder, a turbocharger, an intercooler, an electronic control unit, and a compression release brake, said turbocharger for compressing intake air for delivery into the intercooler, and said intercooler for lowering the temperature of the compressed air from the turbocharger for delivery into an intake manifold of the engine, comprising:
   a compression release brake controller for engaging said compression release brake;
   an intercooler bypass assembly for automatically diverting at least a portion of the compressed air from the turbocharger directly into the intake manifold and around the intercooler upon receiving a bypass signal from the compression release brake controller;
   a fuel injection assembly which, upon receiving an injection signal from the engine electronic control unit, injects a small quantity of fuel into the cylinder during a compression stroke of the engine while said compression release brake is engaged.

2. The internal combustion engine according to claim 1, wherein said intercooler bypass assembly comprises:
   a channel adapted for carrying the compressed intake air from the turbocharger to the intake manifold; and
   at least one valve, wherein said at least one valve directs air from the turbocharger through one of a member of the group consisting of said channel and said intercooler upon receiving the bypass signal from said engine electronic control unit.

3. The internal combustion engine according to claim 1, wherein said compression release brake controller has a switch to initiate engagement of the compression release brake.

4. The internal combustion engine according to claim 1, wherein said small quantity of fuel is selected such that it is completely combusted during said compression stroke of the engine.

5. The internal combustion engine according to claim 1, wherein said small quantity of fuel ranges from about 1 to about 45 milligrams of fuel per stroke.

6. The internal combustion engine according to claim 1, wherein said small quantity of fuel is about 5 milligrams of fuel per stroke.

7. The internal combustion engine according to claim 1, wherein said fuel injection assembly comprises one or more fuel injection nozzles and a fuel injection controller.

8. The internal combustion engine according to claim 1, wherein said engine is a diesel engine.

9. The internal combustion engine according to claim 1, wherein said intercooler is an air to air intercooler.

10. The internal combustion engine according to claim 1, wherein said turbocharger comprises a compressor and turbine.

11. A method of operating an internal combustion engine as defined in claim 1 in a compression braking mode, said internal combustion engine having a turbocharger and intercooler, the method comprising the steps of:
    compressing intake air with the turbocharger;
    diverting at least a portion of compressed air around said intercooler and directly into an intake manifold of the engine such that the air is not substantially cooled following compression;
    injecting said air from the intake manifold into an engine cylinder having a piston, said piston located at a first position;
    compressing said air within the cylinder by advancing said piston from said first position to a second position;
    injecting a small quantity of fuel into said cylinder while said piston is advancing from the first to the second position such that the quantity of the fuel combusts substantially completely with said air within the cylinder; and
    exhausting contents of said cylinder when said piston is near said second position.

12. The method according to claim 11, wherein said diverting step diverts all the air around said intercooler and directly to the intake manifold.

13. The method of claim 11, wherein said minimum amount of fuel ranges from about 1 to about 45 milligrams per stroke.

14. The method of claim 13, wherein said minimum amount of fuel is about 5 milligrams per stroke.

15. An internal combustion engine having at least one cylinder, a compressor, an intercooler, a control unit, and a compression release brake, said compressor for compressing intake air for delivery into the intercooler, and said intercooler for lowering the temperature of the compressed air from the compressor for delivery into an intake of the engine, comprising:
    a compression release brake controller for engaging said compression release brake;
    an intercooler bypass assembly for automatically diverting at least a portion of the compressed air from the compressor directly into the intake of the engine and around the intercoolor upon receiving a bypass signal from the compression release brake controller;
    a fuel injection assembly which, upon receiving an injection signal from the engine control unit, injects a small quantity of fuel into the cylinder during a compression stroke of the engine while said compression release brake is engaged.

16. The internal combustion engine according to claim 15, wherein said intercooler bypass assembly comprises:
   a channel adapted for carrying the compressed intake air from the compressor to the intake; and
   at least one valve, wherein said at least one valve directs air from the compressor through one of a member of the group consisting of said channel and said intercooler upon receiving the bypass signal from said engine control unit.

17. The internal combustion engine according to claim 15, wherein said compression release brake controller has a switch to initiate engagement of the compression release brake.

18. The internal combustion engine according to claim 15, wherein said small quantity of fuel is selected such that it is completely combusted during said compression stroke of the engine.

19. A method of operating an internal combustion engine as defined in claim 15 in a compression braking mode, said internal combustion engine having a compressor and intercooler, the method comprising the steps of:

compressing intake air with the compressor;

diverting at least a portion of compressed air around said intercooler and directly into an intake of the engine such that the air is not substantially cooled following compression;

injecting said air into an engine cylinder having a piston, said piston located at a first position;

compressing said air within the cylinder by advancing said piston from said first position to a second position;

injecting a small quantity of fuel into said cylinder while said piston is advancing from the first to the second position such that the quantity of the fuel combusts substantially completely with said air within the cylinder; and exhausting contents of said cylinder when said piston is near said second position.

20. The internal combustion engine according to claim 19, wherein said small quantity of fuel is selected such that it is completely combusted during said compression stroke of the engine.

* * * * *